US006789099B2

(12) United States Patent
Kim et al.

(10) Patent No.: US 6,789,099 B2
(45) Date of Patent: Sep. 7, 2004

(54) SENSE-AMP BASED ADDER WITH SOURCE FOLLOWER EVALUATION TREE

(75) Inventors: Jae-Joon Kim, West Lafayette, IN (US); Ching-Te K. Chuang, South Salem, NY (US); Rajiv V. Joshi, Yorktown Heights, NY (US); Kaushik Roy, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 10/167,170

(22) Filed: Jun. 10, 2002

(65) Prior Publication Data

US 2004/0073592 A1 Apr. 15, 2004

(51) Int. Cl.[7] ................................................. G06F 7/50
(52) U.S. Cl. .......................................... 708/710; 326/95
(58) Field of Search ............................. 326/93, 95, 98, 326/121; 708/702, 704, 710

(56) References Cited

PUBLICATIONS

Kim et al., "SOI-optimized 64–bit high–speed CMOS adder design", VLSI Circuits Digest of Technical Papers, 2002. Symposium on, Jun. 13–15, 2002, pp. 122–125.*
Matsui et al., "A 200 MHz 13 $mm^2$ 2–D DCT Macrocell Using Sense–Amplifying Pipeline Flip–Flop Scheme", IEEE Journal of Solid–State Circuits, vol. 29. No. 12, Dec. 1994, pp. 1482–1490.

Lai et al. "Design and Implementation of Differential Cascode Voltage Swtich with Pass–Gate (DCVSPG) Logic for High–Performance Digital Systems", IEEE Journal of Solid–State Circuits, vol. 32. No. 4, Apr. 1997, pp. 563–573.
Grotjohn et al., "Sample–Set Differential Logic (SSDL) for Complex High–Speed VLSI", IEEE Journal of Solid–State Circuits, vol Sc–21. No. 2, Apr. 1986, pp. 367–368.
Pong–Fei Lu et al., "Floating–Body Effects in Partially Depleted SOI CMOS Circuits", IEEE Journal of Solid–State Circuits, vol. 32. No. 8, Aug. 1997, pp. 1241–1253.
Park et al., "470ps 64bit Parallel Binary Adder", VLSI Circuits Digest of Technical Papers, 2000, pp. 192–193.
Lu, "Implementation of Iterative Networks with CMOS Differential Logic", IEEE Journal of Solid–State Circuits, vol. 23. No. 4, Aug. 1988, pp. 1013–1017.
Naffziger, "SP22.5: A Sub–Nanosecond 0.5 $\mu$m 64b Adder Design", ISSCC96/Session 22/ Microprocessing Functional Blocks & Circuits/Paper SP22.5, Feb. 10, 1996, 2 pages.

* cited by examiner

Primary Examiner—Daniel D. Chang
(74) Attorney, Agent, or Firm—Louis J. Percello; Harrington & Smith, LLP

(57) ABSTRACT

A 64-bit adder implemented in partially depleted silicon on insulator technology and having two levels of lookahead uses a dynamic eight-bit carry module containing a cascode evaluation tree employing a chain of source followers that feeds a sense amplifier, thereby obtaining benefits from high initial drive, low variation in body voltage, resulting in low variation in history-dependent delay, reduced noise sensitivity and noise-based delay.

6 Claims, 8 Drawing Sheets

COMMON SOURCE

SOURCE FOLLOWER

COMMON SOURCE

SOURCE FOLLOWER

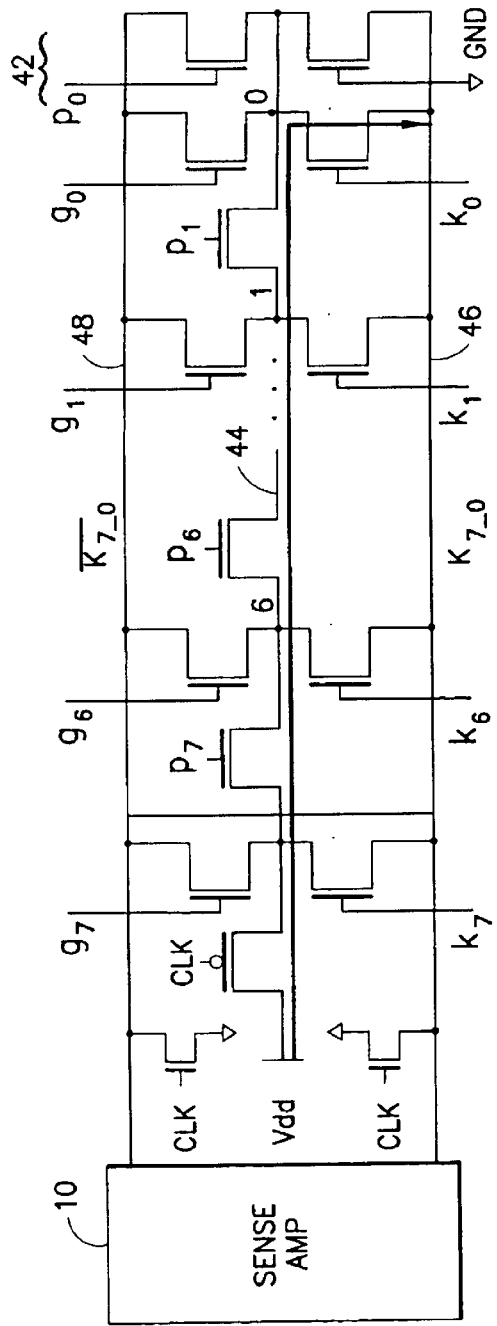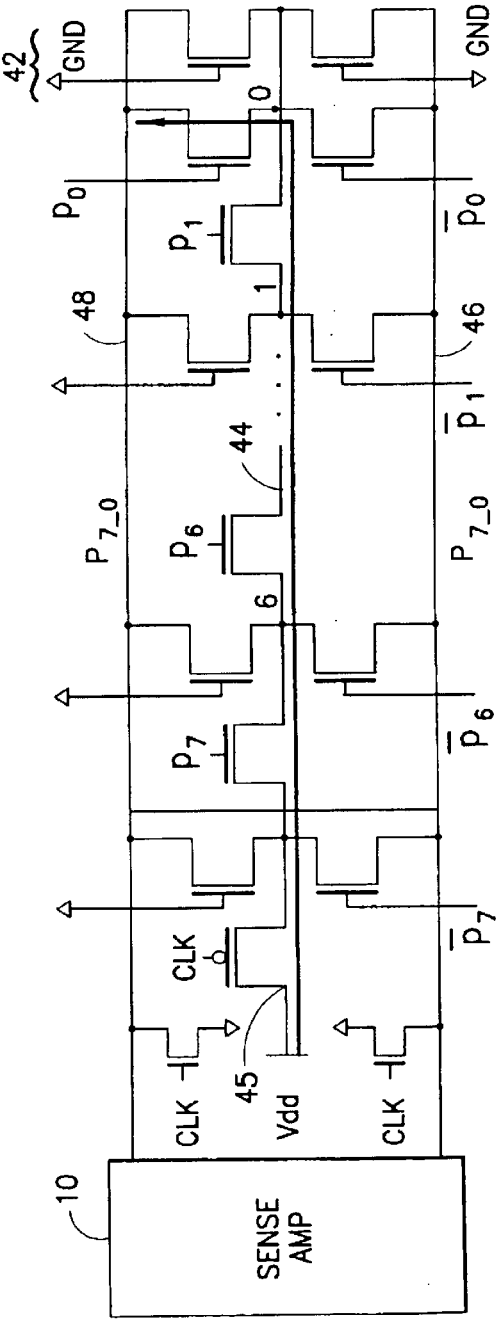
FIG.6B
FIG.6C

US 6,789,099 B2

SENSE-AMP BASED ADDER WITH SOURCE FOLLOWER EVALUATION TREE

FIELD OF THE INVENTION

The field of the invention is that of high speed CMOS logic, in particular that of lookahead adders.

BACKGROUND OF THE INVENTION

In the field of high speed dynamic CMOS circuits, there have been several efforts to reduce the delay of high fan-in circuits by using the dynamic differential circuit and sense-amplifier (sense-amp) together. Recent circuit styles use differential cascode voltage logic (DCVS) for the logic evaluation tree.

FIG. 1A shows in simplified form, a prior art circuit diagram, including sense amp 1 and logic evaluation circuit 15'. The CLK signals are applied to equilibrate the Q and Q# nodes (using the convention that Q# means the logic complement of Q) of the sense amp to VDD and the delayed CLK signal opens a current path to ground. Clocked footer transistors 16 and 16' provide the optional ability to cut off current flow te ground and cause the transistors in units 15 and 15' to float up to some voltage above ground.

Logic tree circuit 15' performs the logic analysis and applies a differential input to nodes Q and Q#. Sense amp 1 will respond to the differential signal once the difference exceeds the noise level and will drive nodes Q and Q# to the rails.

SUMMARY OF THE INVENTION

The invention relates to a multi-bit high speed adder employing a two level lookahead carry structure.

A feature of the invention is a 64-bit adder implemented in partially depleted silicon on insulator technology and having only two levels of lookahead carry implemented in sense-amp based differential logic.

Another feature of the invention is the use of a dynamic eight-bit carry module containing a cascode evaluation tree employing a chain of source followers that feeds a sense amplifier.

Yet another feature of the invention is the use of partially depleted silicon on insulator technology in the evaluation tree, thereby obtaining benefits from high initial drive, low variation in body voltage, resulting in low variation in history-dependent delay, reduced noise sensitivity and noise-based delay.

BRIEF DESCRIPTION OF THE DRAWINGS

FIGS. 6A–6C illustrate logic modules for generating G,P,K signals.

BEST MODE OF CARRYING OUT THE INVENTION

Figures 1A, 1B:
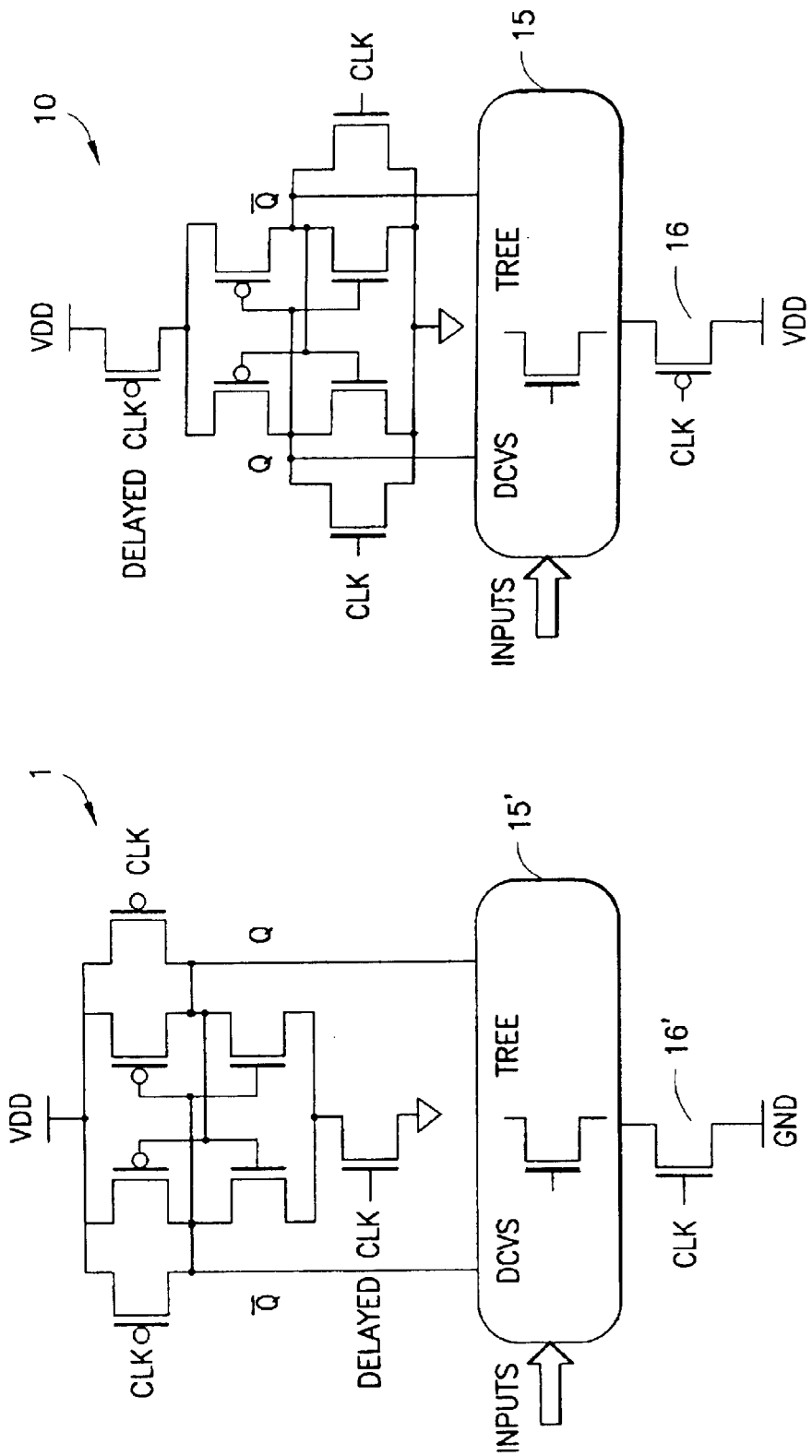
FIGS. 1A and 1B illustrate in simplified form logic modules used in the prior art and in the invention, respectively.

FIG. 1B shows a differential circuit according to the invention with sense amp 10 and source follower logic tree 15. The CLK signals equilibrate nodes Q and Q# in sense amp 10 to ground and the delayed CLK signal opens a current path to VDD. In operation, the power supply raises the voltage of node Q# (assuming for purposes of illustration that this is the node that will go high) and it triggers the sense-amp. Once the sense-amp is enabled, noise current flows to both output nodes because PMOS's in the sense-amp are initially turned on. The noise charge at the node Q is discharged to the ground through the NMOS in the sense-amp, since this node is going low. The noise charge at the node Q# is discharged to VDD through the NMOS chain in the logic evaluation circuit 15', since this node is going high.

The worst delay case condition of the prior art occurs when the every intermediate node is pre-charged to Vdd-Vth. This condition can be realized when there is an "on"-path from Q(or Q#) to the top node of the footer device in the precharge mode. Because footer 16' is turned off in the precharge mode, every intermediate node is precharged to "Vdd-Vth", referred to as "high". The worst case delay in module 15 occurs when every intermediate node is pre-discharged to ground.

Figure 2A:
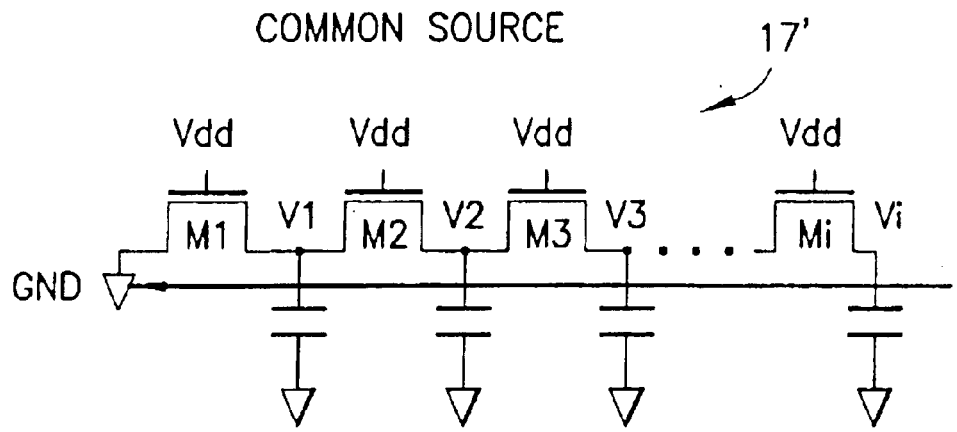
FIGS. 2A and 2B illustrate NMOS chains for logic implementation used in the prior art and in the invention, respectively.
Figure 2B:
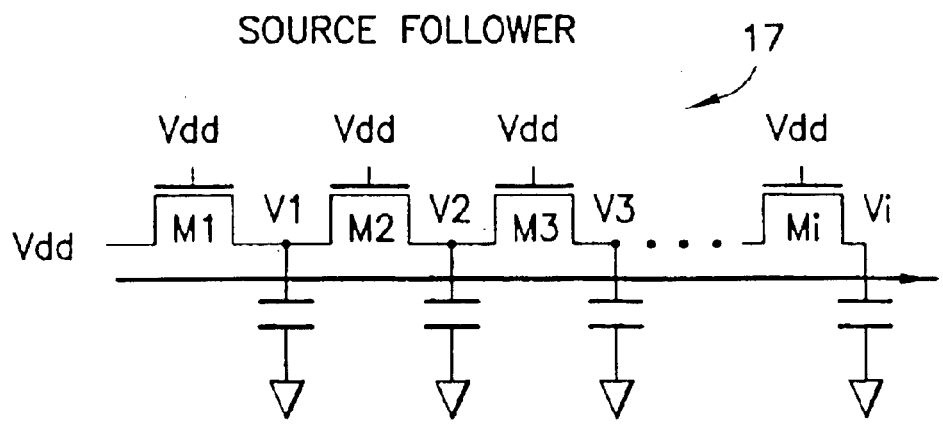

FIGS. 2A and 2B illustrate logic in the respective circuits. In FIG. 2A (following the convention that the A portion of the Figure represents the prior art), the logic trees are formed in common source configuration, with the end of the chain tied to ground and the intermediate nodes precharged high (meaning to $V_{dd}$ or to $V_{dd}$-$V_{th}$). In FIG. 2B, the end of the chain is tied to Vdd or any other reference voltage Vref and the intermediate nodes are precharged to ground in the worst case. Thus, the transistors in FIG. 2B turn on essentially simultaneously when the voltage applied to the gates exceeds the threshold. The simultaneous turning-on of the transistors aids in accommodating the worst case, but the fastest operation is when the internal nodes are high and only the last transistor is needed to pass current from node Ni to the adjacent pre-charged node. In contrast, the circuit in FIG. 2A is inherently sequential. Since the nodes are precharged high, the jth transistor will not turn on until Vj becomes Vdd-Vth. Thus, the transistors cannot be turned on simultaneously and it takes time until the jth transistor can "see" the ground node.

In addition, the circuit of FIG. 2A has very little gate overdrive when first turned on because the intermediate nodes are precharged to Vdd. In contrast, the circuit in FIG. 2B has large gate overdrive at the time of turn-on because the intermediate nodes are at ground. Accordingly, circuits based on FIG. 2B have very low resistance at the initial moment of operation. Those skilled in the art are aware that the common source logic tree of FIG. 1A will overcome the initial lack of drive and will drive to the rails more quickly than the circuit of FIG. 1B. The inventors have realized, however, that in dynamic logic based on triggering a sense amp, the important consideration is the initial resistance because the sense amp is triggered long before the logic chain approaches a rail voltage.

Figure 3A:
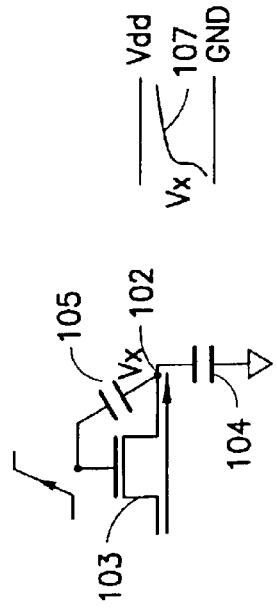
FIGS. 3A and 3B illustrate capacitive coupling and its effect on initial transistor drive in the prior art and in the invention, respectively.

Referring now to FIG. 3A, the directions of the voltage swing on the gate (Input) and output 102' of transistor 103' are opposite—the gate is rising and the output is falling from Vdd to ground. Accordingly, the Miller effect due to capacitive coupling between the input and output puts an additional burden on the pull-down of the output node. The capacitances are denoted by capacitors 105' and 104'. The time dependence of the voltage swing is illustrated schematically in curve 107'. The "bump" in curve 107' results from the greater capacitive coupling and slows down circuit operation because of the greater voltage difference between the highest and lowest relevant voltages.

Figure 3B:
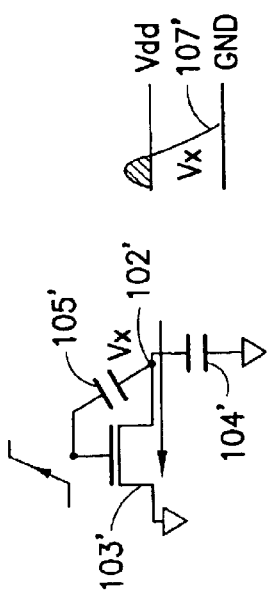

In contrast, the directions of the voltage swing of input and output of transistor 103 in FIG. 3B are the same, so that the Miller effect is not present. In fact, the capacitive coupling helps the pull-up of the output node. Curve 107 illustrates the sharp initial rise that helps to trigger the sense amp early and thus contribute to faster switching time. This is so because the capacitive coupling between gate and source in a device formed in partially depleted SOI is greater than that of a bulk CMOS device because of the low junction capacitance 107 of PD/SOI, so that this capacitive coupling effect on delay is more important in PD/SOI than that in bulk CMOS.

Figure 4A:
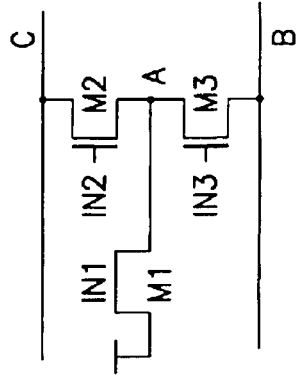
FIGS. 4A and 4B illustrate transient bipolar noise generation in the prior art and in the invention, respectively.
Figure 4B:
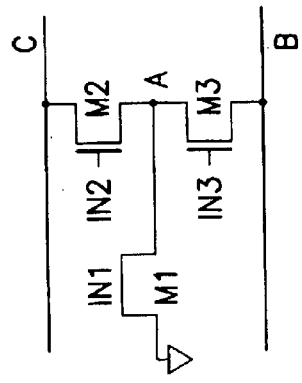

Referring now to FIG. 4A, there is shown a difference in the contribution to noise from the two circuits 1A and 1B when implemented in PD/SOI. In FIG. 4A, a transient bipolar turn-on condition from the circuit configuration of FIG. 1A comes about as follows: During the precharge period, nodes A, B and C are all precharged to high, so that the body of transistor M3 is also high. When the inputs In1 and In2 are high and In3 is low, in the evaluation phase, the voltages of A and C go low. In this case, there is a large voltage difference between the node A and the body of M3. This large positive body-to-source voltage triggers the transient bipolar turn-on of M3 and noise current flows from B to A. In the circuit according to FIG. 1B, there is no bipolar turn-on condition. For the same input condition as the other circuit, the voltage difference between node A and the body of M3 becomes negative. There is no bipolar turn-on because the diode between the node and the body is reverse biased.

In addition to the foregoing, the prior art circuit precharges the sources and drains high, so that the body voltage variation is greater than in circuits according to the invention. In the prior art, the body is at a high voltage, so that when the gate goes high, the body voltage becomes higher than the supply voltage because there is no gate inversion layer to shield the gate-to body coupling. The body subsequently loses charge in following cycles, so that the variation of body voltages across the circuit is large. In circuits according to the invention, the sources and drains of the pass transistors are predischarged to ground. When the gate goes high, the gate-to-body coupling occurs while the gate voltage is smaller than $V_{th}$. Once the gate voltage passes $V_{th}$, the inversion layer provides shielding, so that the body voltage variation is much smaller in circuits according to the invention than in the prior art. Because delay variation is proportional to body voltage variation, circuits according to the invention have smaller delay variation than do corresponding circuits constructed according to the prior art.

A SPICE simulation of an 8-bit differential carry lookahead circuit (100 nm channel length) using the invention, the prior art discussed herein was performed using University of Florida SOI parameters. The result was that the invention was 52% faster than the prior art.

Figure 7:
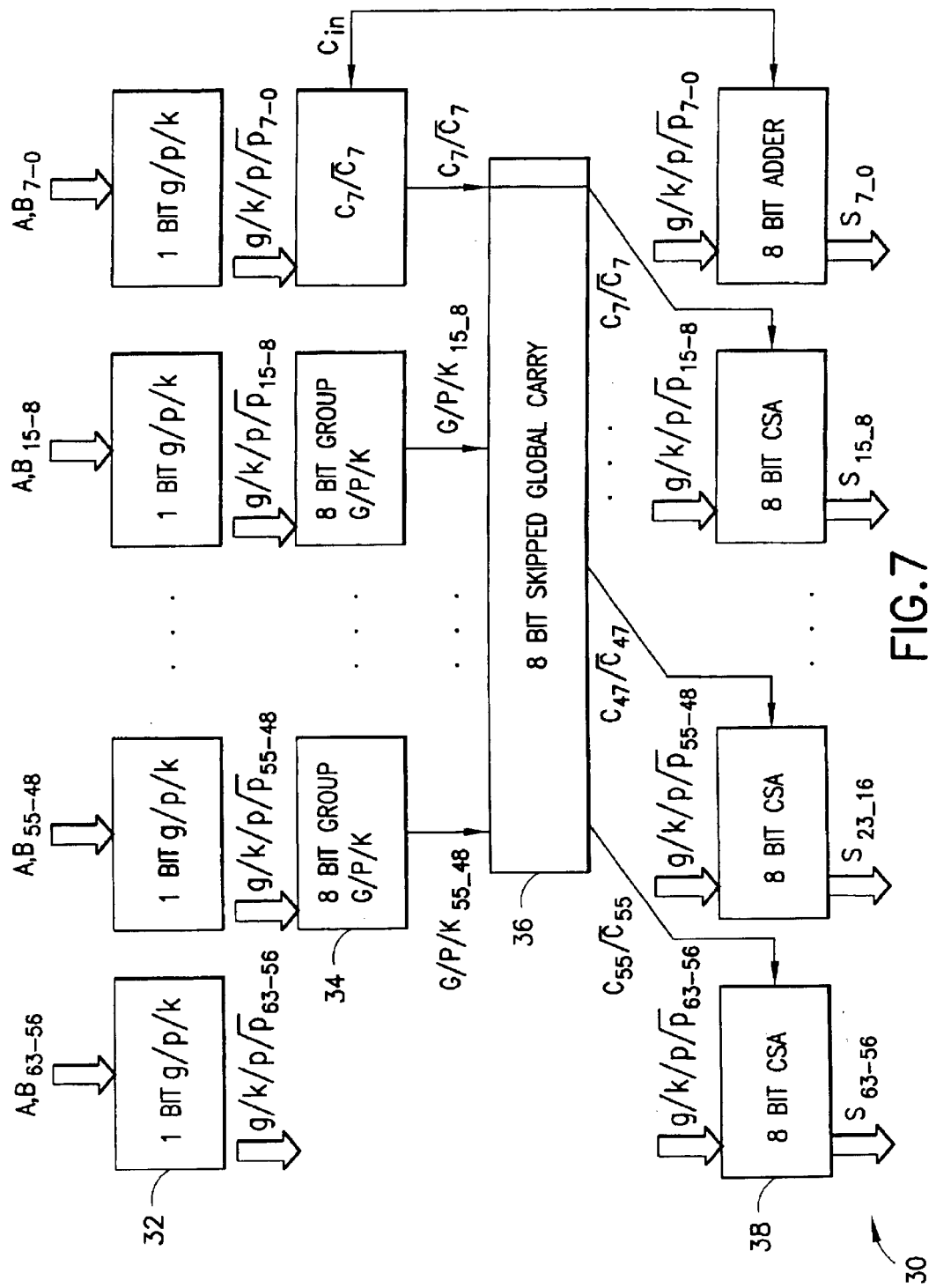
FIG. 7 illustrates an adder according to the invention.

Referring now to FIG. 7, there is shown a block diagram of a 64-bit adder 30 using the invention. At the top, eight circuits 32 contain a set of single-bit circuits that form generation propagation and kill signals using $g_j/p_j/p_j\#/k_j$ (j=0–63) according to the following:

Definition 1

$$g_i = Ai \cdot Bi, p_i = Ai \oplus Bi, k_i = Ai\_not \cdot Bi\_not$$

Those skilled in the art will appreciate that gi, pi and ki are mutually exclusive; i.e. for each i, one and only one of gi, pi or ki will be logic 1. Those skilled in the art will be easily able, in the light of this disclosure, to construct one-bit domino circuits to generate $g_i$, $p_i$, and $k_i$.

On the next row, 8-bit circuits 34 generate corresponding eight-bit signals G,P and K according to Definition 2

$$G_{i+7\_i} = g_{i+7} + p_{i+7}g_{i+6} + \ldots + (p_{i+7} \ldots p_{i+1})g_i$$

$$K_{i+7\_i} = k_{i+7} + p_{i+7}k_{i+6} + \ldots + (p_{i+7} \ldots p_{i+1})k_i$$

$$P_{i+7\_i} = p_{i+7}p_{i+6}p_{i+5}p_{i+4}p_{i+3}p_{i+2}p_ip_i$$

$$G_{i+7\_i}\# = K_{i+7\_i} + P_{i+7\_i} = k_{i+7} + p_{i+7}k_{i+6} + \ldots + (p_{i+7} \ldots p_{i+1})(k_i + p_i)$$

$$K_{i+7\_i}\# = G_{i+7\_i} + P_{i+7\_i} = g_{i+7} + p_{i+7}g_{i+6} + \ldots + (p_{i+7} \ldots p_{i+1})(g_i + p_i)$$

$$P_{i+7\_i}\# = p_{i+7}\# + p_{i+6}\# + \ldots + p_{i+1}\# + p_i\#$$

where, $j=i, i+1, \ldots, i+7$ and $i=0,7,\ldots,47$ $G_{i+7,i}$, $P_{i+7,i}$ and $K_{i+7,i}$ are also mutually exclusive.

Figure 6A:
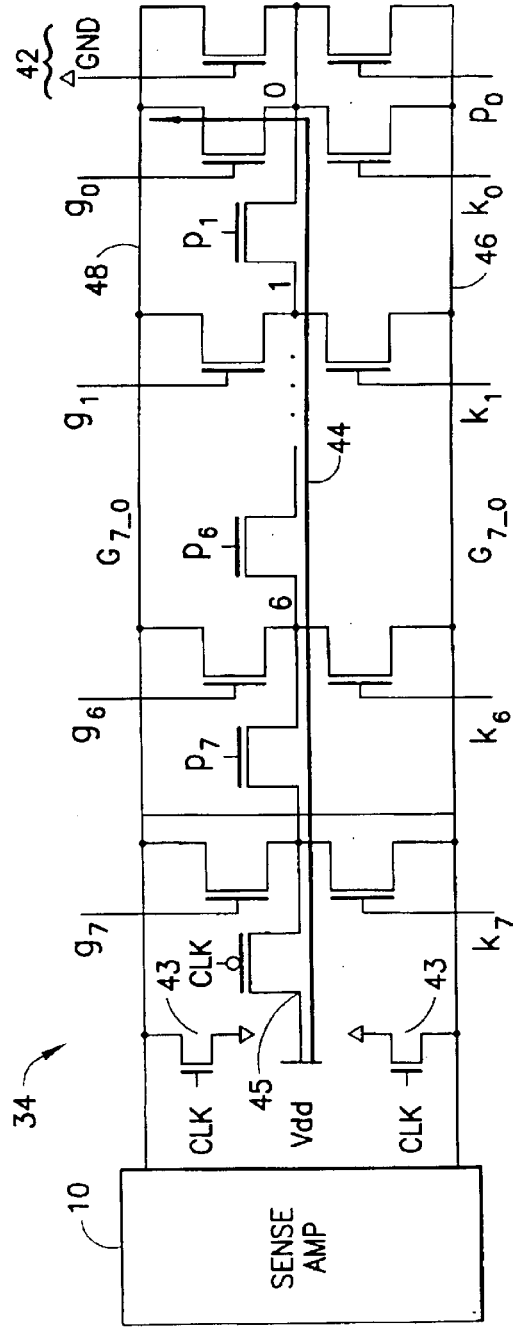

Referring now to FIG. 6, there are shown 3 examples of a circuit 34 according to the invention that perform the logic operations in Definition 2. Sense amps 10 are shown in FIG. 1B. The remainder of the circuits are examples of the logic tree 15 that carries out the logic operations in Definition 2. FIG. 6A generates G and G#, FIG. 6B generates K, K# and FIG. 6C generates P, P#. At the top and bottom of each module, nodes 48 and 46 are predischarged to ground when CLK is high. In FIG. 6A, the set of signals $G_i$ are applied to the NFET transistors connecting intermediate nodes (0–6) in chains 44 to node 48. Likewise for the set $K_i$ and node 46. In the center of the Figure, the left end of chain 44 (first node) is connected to $V_{dd}$ through PFET 45 when the CLK signal is low during the evaluation period. $V_{dd}$ is connected through one of the gi or ki to one of nodes 46 or 48 during the evaluation period when CLK is low, causing the sense amp to assume the corresponding state. Signal p0 is applied to the connecting transistor in section 42 at the end of the chain. The other transistor has its gate tied to ground in order to balance the capacitance among the three modules. A reduced set of signals $P_7$ to $P_1$ is applied to the NFET pass transistors that make up chain 44.

During the precharge period, the two bit lines 46 and 48 are pre-discharged to ground through the CLKed NMOS at the left of the figures in the precharge mode. During the evaluation mode, the sense amp will connect one of the bit lines to the supply voltage and the other one to ground.

In operation, each node of chain 44 will be connected to either node 46 or to 17 node 48, since the individual $G_i$ and $P_i$ are mutually exclusive. Reading from the left of chain 44, the first node represents the first term in the first line of Definition 2. If $P_7$ is logic low, only the first intermediate node is connected to $V_{dd}$. If $P_7$ is high, then the next intermediate node will be connected to one or the other of the connecting nodes 46 and 48 (the second term), etc. Sense amp 10 will respond to the voltage difference between nodes 46 and 48 and pass on a signal at the full logic level to the next circuit in the system. At the right end of the chain, denoted with bracket 42, $p_0$ controls a transistor connecting the last node in the chain 44 to one of nodes 46 or 48. The other transistor is tuned off, leaving the drain capacitance in the circuit.

Figure 5:
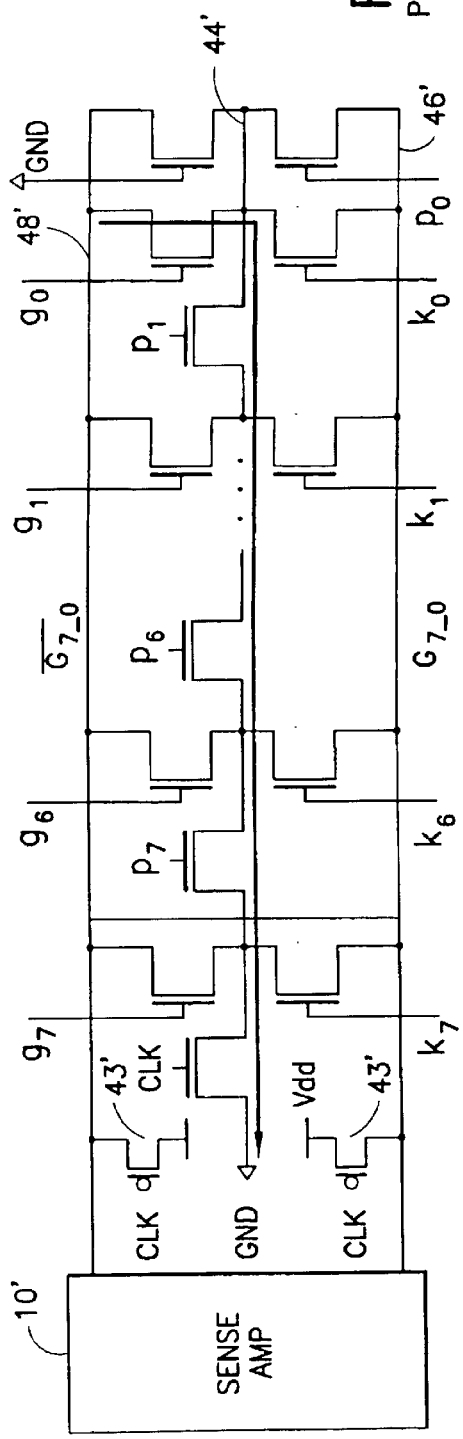
FIG. 5 illustrates a prior art logic module.

The circuit in FIG. 5 is an example of the circuit of FIG. 1A, with sense amp 1 and the remainder of the circuit as an example of logic tree 15'. At the center of FIG. 5, a chain of NFETs P1–P7 denoted with numeral 44' terminates in a connection to ground, in contrast to the connection to Vref in FIG. 6A. The internal nodes are charged to Vdd by turning off clocked footer 16' in FIG. 1A.

Referring again to FIG. 7, the circuits in row 34 each generate 1 bit (and their complements—understood) for each of G, K and P (i.e. each module generates 3 bits and their complements) that pass to an 8-bit carry lookahead adder 36 that generates the six carry bits required (the eight least significant carry bit has already been generated in row 34). Adder 36 carries out the following Definition 3

$$C_{55}=G_{55\_48}+P_{55\_48}G_{47\_40}+\ldots+P_{55\_48}\ldots P_{15\_8}C_7$$

$$C_{55}\#=K_{55\_48}+P_{55\_48}K_{47\_40}+\ldots+P_{55\_48}\ldots P_{15\_8}C_7\#$$

$$C_{47}=G_{47\_40}+P_{47\_40}G_{39\_32}+\ldots+P_{47\_40}\ldots P_{15\_18}C_7$$

$$C_{47}\#K_{47\_40}+P_{47\_40}K_{39\_32}+\ldots+P_{47\_40}\ldots P_{15\_8}C_7\#$$

$$C_{15}=G_{15\_8}+P_{15\_8}C_7$$

$$C_{15}\#=K_{15\_8}+P_{15\_8}C_7\#$$

Figure 8:
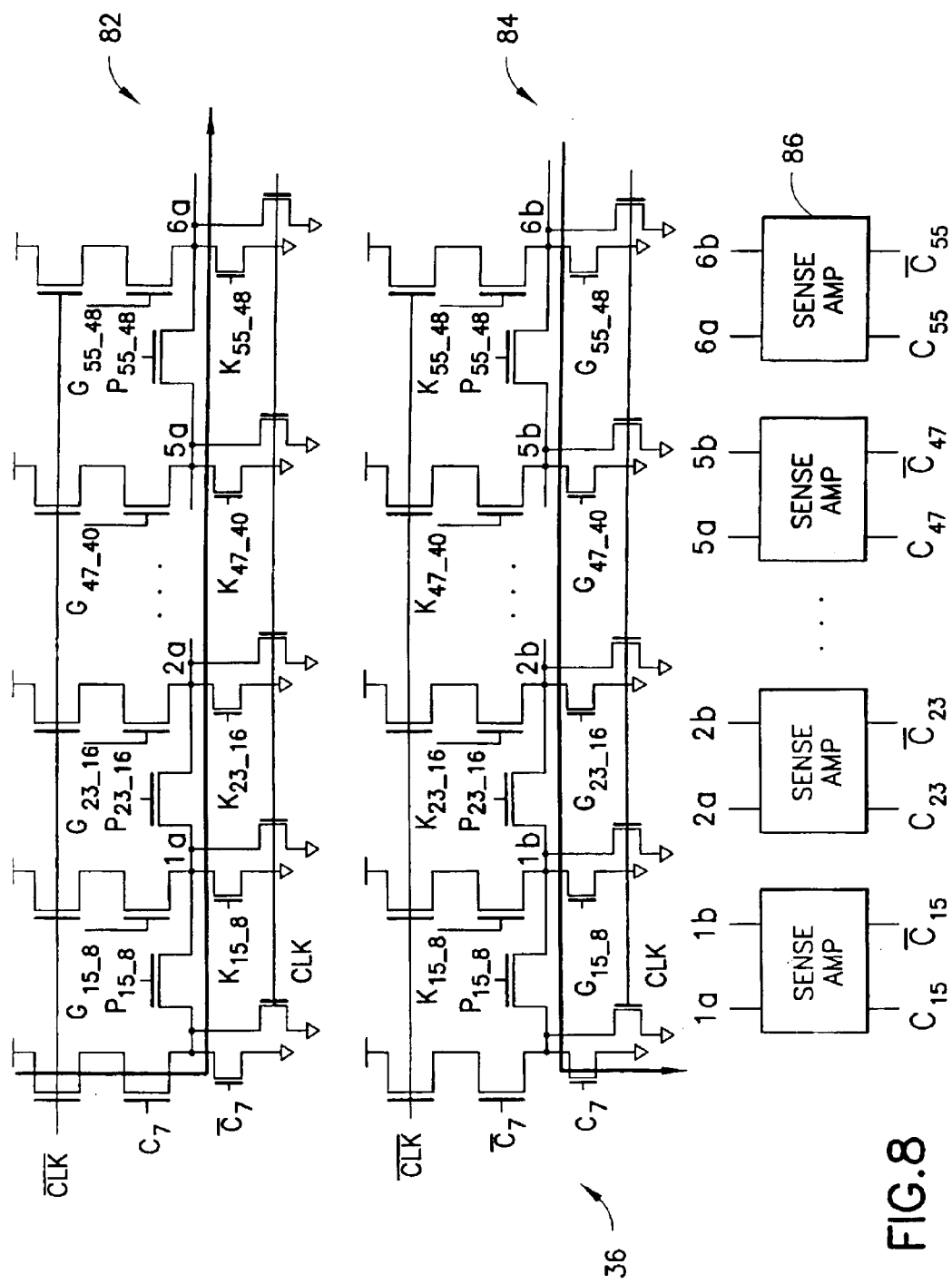
FIG. 8 illustrates a logic module for generating 8 bit skipped global carry signals.

FIG. 8 shows the schematic diagram of multiple output global carry generating circuit 36. Eight-bit skipped global carries ($C_{15}$, $C_{23}$, $C_{31}$, $C_{39}$, $C_{47}$, $C_{55}$) are generated simultaneously. The logic module denoted with 82 generates signals 1a, 2a–6a at intermediate nodes in the chain of source follower transistors from signals G, K and P according to definition 3. These signals feed into sense amps 86 on the bottom row of the Figure. Similarly, module 84 generates signals 1b,–6b. Gate load capacitance at each intermediate node does not degrade the performance significantly since a small swing is enough to trigger sense amplification. Fan-out of the first level 8 bit group G/P/K circuit 34 can be minimized because only one global carry generating circuit 36 is needed.

Adder 30 is able to use only a two level carry lookahead because the modules are 8-bit, so that carry back propagation or intermediate carry propagation for carry select adder is not necessary.

Figure 9:
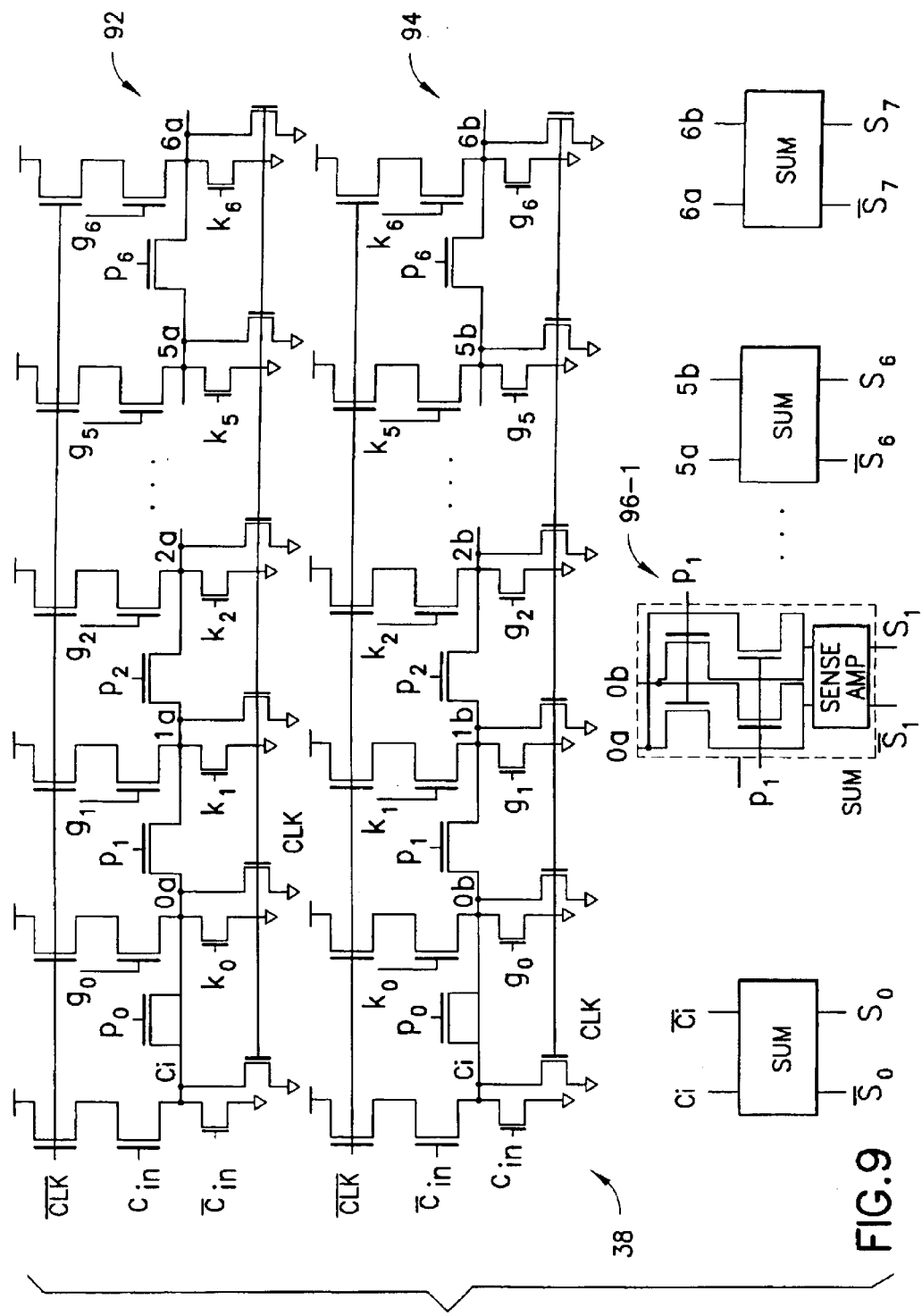
FIG. 9 illustrates a logic module for generating the final sums from the data of FIG. 8.

FIG. 9 illustrates one of two 8-bit Ripple Carry adders that make up units 38. Modules 92 and 94 each generate a bit that goes to a sum circuit, e.g. sum 96-1, that forms bit 1 of the output. The output of one of the adders in unit 38 will be selected in response to a carry bit; e.g. both the outputs of the sum modules 96 in FIG. 9 and corresponding sum modules from the other adder will feed into multiplexers that will select one of the outputs in response to a carry bit. Within units 92 and 94, the top row of transistors, controlled by the Clk# signal, connects a high signal to a transistor controlled by gi that connects to an intermediate node in the central transistor chain. The transistors in the central chain are controlled by signals pi. The intermediate nodes are further connected by transistors connected to Vdd and controlled by ki and a precharge transistor controlled by the Clk signal (that is also connected to Vdd). The outputs of modules 92 and 94 are taken from the intermediate nodes of the central chains of 92 and 94.

One of the two potential sums is selected in each module 38 by a two-input multiplexer responsive to the relevant carry bit. These alternative sums are calculated at the same time that the carry bits are generated in module 36, so that the delay of module 36 is not on the critical delay path. Accordingly, a requirement on the design of module 38 is that its delay be less than the delay for the carry generation process.

The allocation of functions to blocks in this Figure is made for purposes of illustration only and those skilled in the art will readily realize that functions may be performed in different locations. For example, the function of multiplexing could be allocated to a separate block.

While the invention has been described in terms of a single preferred embodiment, those skilled in the art will recognize that the invention can be practiced in various versions within the spirit and scope of the following claims.

We claim:

1. An N-bit two level lookahead adder for adding two N-bit numbers, comprising summing means for calculating alternative partial M-bit sums;

a first set of carry modules for generating $g_i$, $p_i$ and $k_i$ signals for each of the N bits;

a second set of carry modules, responsive to said $g_i$, $p_i$ and $k_i$ signals, for generating a set of M-bit G, P and K signals therefrom, each of said set of carry modules having a sense amplifier connected to a logic evaluation module containing two connecting nodes connected to said sense amplifier, and a chain of source follower transistors having a first node, a final node and a set of intermediate nodes controllably connected to both said two connecting nodes by first and second sets of connecting transistors, first precharge means for precharging each of said set of two connecting nodes to ground;

means for charging said first node to a reference voltage other than ground in an evaluation mode; and a set of output modules, responsive to said set of carry signals, for selecting alternative partial sums and connecting a selected set of said alternative partial sums to a set of output terminals.

2. An adder according to claim 1, comprising a set of partially depleted silicon transistors disposed in an integrated circuit formed in a device layer disposed above an insulating layer on a substrate.

3. An adder according to claim 2, in which said set of partially depleted transistors have floating bodies.

4. An adder according to claim 1, further comprising a global carry module for generating carry signals comprising first and second carry logic modules, each comprising a chain of source follower transistors connected through a series of intermediate nodes, each of said intermediate nodes being connected to ground and to a reference voltage through transistors controlled by said G and K signals, each of said intermediate nodes of said first and second carry logic modules being connected to corresponding first and second inputs of a set of sense amplifiers, the outputs of said set of sense amplifiers being said carry signals.

5. An adder according to claim 4, comprising a set of partially depleted silicon transistors disposed in an integrated circuit formed in a device layer disposed above an insulating layer on a substrate.

6. An adder according to claim 5, in which said set of partially depleted transistors have floating bodies.

* * * * *